(12) United States Patent
Fulks et al.

(10) Patent No.: US 7,673,950 B2
(45) Date of Patent: Mar. 9, 2010

(54) VEHICLE AUTONOMOUS BRAKE-APPLY SYSTEM AND METHOD

(76) Inventors: Gary C. Fulks, 1020 Green Timber Trail, Dayton, OH (US) 45458; Douglas E. Poole, 7059 Safari Dr., Dayton, OH (US) 45424; Timothy A. Haerr, 18 Nightingale Trail, Enon, OH (US) 45423; Xavier Groult, 8 Place Clement Ader, Survilliers 95470 (FR)

( * ) Notice: Subject to any disclaimer, the term of this patent is extended or adjusted under 35 U.S.C. 154(b) by 1135 days.

(21) Appl. No.: 11/265,612

(22) Filed: Nov. 2, 2005

(65) Prior Publication Data

US 2006/0091728 A1    May 4, 2006

Related U.S. Application Data

(60) Provisional application No. 60/624,915, filed on Nov. 4, 2004.

(30) Foreign Application Priority Data

Nov. 17, 2004    (EP) ................... 04292719

(51) Int. Cl.
*B60T 8/32* (2006.01)
(52) U.S. Cl. .............. 303/193; 303/191; 180/170
(58) Field of Classification Search ......... 303/193, 303/191; 188/156, 162; 701/96, 301; 180/204, 180/170

See application file for complete search history.

(56) References Cited

U.S. PATENT DOCUMENTS

| 5,372,409 | A | | 12/1994 | Farr |
| 6,016,881 | A | * | 1/2000 | Sakai et al. ............ 180/204 |
| 6,017,102 | A | * | 1/2000 | Aga ...................... 303/191 |
| 6,186,259 | B1 | * | 2/2001 | Shimizu et al. ......... 180/204 |
| 6,244,676 | B1 | | 6/2001 | Watanabe et al. |
| 6,302,497 | B1 | | 10/2001 | Takayama |
| 6,315,092 | B1 | * | 11/2001 | Schwarz ................ 188/265 |
| 6,587,760 | B2 | * | 7/2003 | Okamoto ............... 701/1 |
| 6,702,405 | B1 | * | 3/2004 | Balz et al. ............. 303/192 |
| 6,748,846 | B2 | | 6/2004 | Haerr et al. |

(Continued)

FOREIGN PATENT DOCUMENTS

DE    4201806    9/1992

(Continued)

OTHER PUBLICATIONS

EP search report dated Mar. 9, 2006.

*Primary Examiner*—Robert A Siconolfi
*Assistant Examiner*—Mariano Sy
(74) *Attorney, Agent, or Firm*—Dickinson Wright PLLC

(57) ABSTRACT

A first vehicle autonomous brake-apply system includes a vehicle hydraulic brake assembly, a vacuum booster assembly operatively connected to the vehicle hydraulic brake assembly, a solenoid valve operatively connected to the vacuum booster assembly, and an automatic controller including an output signal operatively connected to the solenoid valve. A second system uses a lateral-acceleration-sensor assembly in place of the automatic controller. A third system includes a braking controller, an electrical braking device, and at least one distance sensor. A method for assisting driving of a vehicle includes applying a braking force to stop the vehicle before the vehicle strikes an obstacle whose distance to the vehicle is measured using at least one distance sensor.

13 Claims, 3 Drawing Sheets

U.S. PATENT DOCUMENTS

| | | |
|---|---|---|
| 6,868,323 B2 * | 3/2005 | Kichima et al. ............... 701/70 |
| 2003/0033073 A1 | 2/2003 | Kichima et al. |
| 2003/0111902 A1 | 6/2003 | Thiede et al. |
| 2003/0135318 A1 | 7/2003 | Tellis et al. |

FOREIGN PATENT DOCUMENTS

| | | |
|---|---|---|
| DE | 10152632 | 5/2003 |
| EP | 0976627 | 2/2000 |
| EP | 1081004 | 3/2001 |
| EP | 04292719 | 4/2005 |

\* cited by examiner

VEHICLE AUTONOMOUS BRAKE-APPLY SYSTEM AND METHOD

CROSS REFERENCE TO RELATED APPLICATIONS

The present application claims priority of U.S. Provisional Application No. 60/624,915 filed Nov. 4, 2004 and European Application No. EP-04292719.4 filed Nov. 17, 2004.

TECHNICAL FIELD

The present invention relates generally to brake systems, and more particularly to a vehicle autonomous brake-apply system and method.

BACKGROUND OF THE INVENTION

Certain conventional vehicles are provided with distance sensors to help the driver in situations of poor visibility, for example when he must reverse park. In certain conventional vehicles, a sound signal is emitted with a frequency as high as the vehicle is close to an obstacle. The driver must then himself estimate the braking force which should be applied. In other known vehicles, the distance measured by the distance sensors is used by a controller to automatically brake the vehicle. However, intervention by the driver is still necessary. In case of an incorrect manoeuvre, the vehicle can strike an obstacle and be damaged. This risk is particularly great in the case of maneuvering on a sloping surface with little free space around the vehicle. In fact, a gradient of 2 to 3% is sufficient to put a car in motion if it is not braked.

A vehicle is known from DE-4 201 806 comprising a distance sensor measuring the distance between the vehicle and an obstacle situated behind the vehicle. When this distance is less than a determined threshold, a control unit activates a pump which increases the pressure of the hydraulic brakes in orders to stop the vehicle.

A lorry is also known from US2003/0111902 including a distance sensor measuring the distance between the lorry and an unloading platform situated behind the lorry. The lorry also includes a velocity sensor. A control unit stores in its memory a minimum profile and a maximum profile defining, for a given distance, a velocity range in which the velocity of the lorry must be situated. If this is not the case, the control unit sends control pulses to a pressure valve to increase or reduce the pressure of the hydraulic brakes of the lorry so that the lorry is automatically stopped against the unloading platform. When the lorry has stopped, the hydraulic pressure is maintained for some seconds. If the engine is switched off, the pressure cannot be maintained. In this case, the driver must manually engaged the parking brake for the lorry to be kept in position. Should the driver forget to do this, if the lorry is on a sloping surface it can be displaced in the direction of the slope and strike an obstacle.

SUMMARY OF THE INVENTION

A first embodiment of the invention is for a vehicle autonomous brake-apply system including a vehicle hydraulic brake assembly, a vacuum booster assembly, a solenoid valve, and an automatic controller. The vacuum booster assembly is operatively connected to the vehicle hydraulic brake assembly. The solenoid valve is operatively connected to the vacuum booster assembly. The automatic controller includes a first output signal operatively connected to the solenoid valve and includes at least one input signal. The first output signal activates the solenoid valve which activates the vacuum booster assembly which activates the vehicle hydraulic brake assembly depending on the at-least-one input signal. The at-least-one input signal includes at least one of a brake-pedal-position signal, a throttle-position signal, and a lateral-acceleration signal.

A second embodiment of the invention is for a vehicle autonomous brake-apply system including a vehicle hydraulic brake assembly, a vacuum booster assembly, a solenoid valve, and a lateral-acceleration-sensor assembly. The vacuum booster assembly is operatively connected to the vehicle hydraulic brake assembly. The solenoid valve is operatively connected to the vacuum booster assembly. The lateral-acceleration-sensor assembly includes an output signal operatively connected to the solenoid valve. The output signal has a predetermined action level and activates the solenoid valve which activates the vacuum booster assembly which activates the vehicle hydraulic brake assembly when the output signal equals or exceeds the predetermined action level.

A method of the invention is for assisting driving of a vehicle and includes several steps. One step includes measuring a distance between the vehicle and an obstacle using at least one distance sensor. Another step includes applying a braking force to at least one wheel of the vehicle using a braking device, wherein the braking force is adapted as a function of the measured distance to stop the vehicle before the vehicle strikes the obstacle, and wherein the braking force is applied by an electrical braking device provided with an integrated parking brake permitting locking of the electrical braking device in a clamping position. Another step includes applying a clamping force to the at-least-one wheel of the vehicle using the parking brake when the vehicle has been stopped for a predetermined period.

A third embodiment of the invention is for a system, for assisting driving of a vehicle, including a braking controller, a braking device, and at least one distance sensor. The braking device is able to apply a braking force to at least one wheel of the vehicle under the control of the braking controller. The at-least-one distance sensor is able to measure the distance between the vehicle and an obstacle. The braking controller is able to adapt the braking force as a function of the distance measured by the at-least-one distance sensor so as to stop the vehicle before the vehicle strikes the obstacle. The braking device is an electrical braking device provided with an integrated parking brake. The braking controller is able to engage the parking brake when the vehicle has been stopped for a predetermined period.

Several benefits and advantages are derived from one or more of the embodiments and method of the invention. In one example, with an appropriate at-least-one input signal, the vehicle autonomous brake-apply system helps keep a distance between the vehicle and an object in the path of the vehicle. In the same or a different example, with an appropriate at-least-one input signal, the system helps keep all vehicle tires on the road. In the same or a different example, with an appropriate at-least-one input signal, the system helps keep a stopped vehicle at rest.

DETAILED DESCRIPTION

Figure 1:
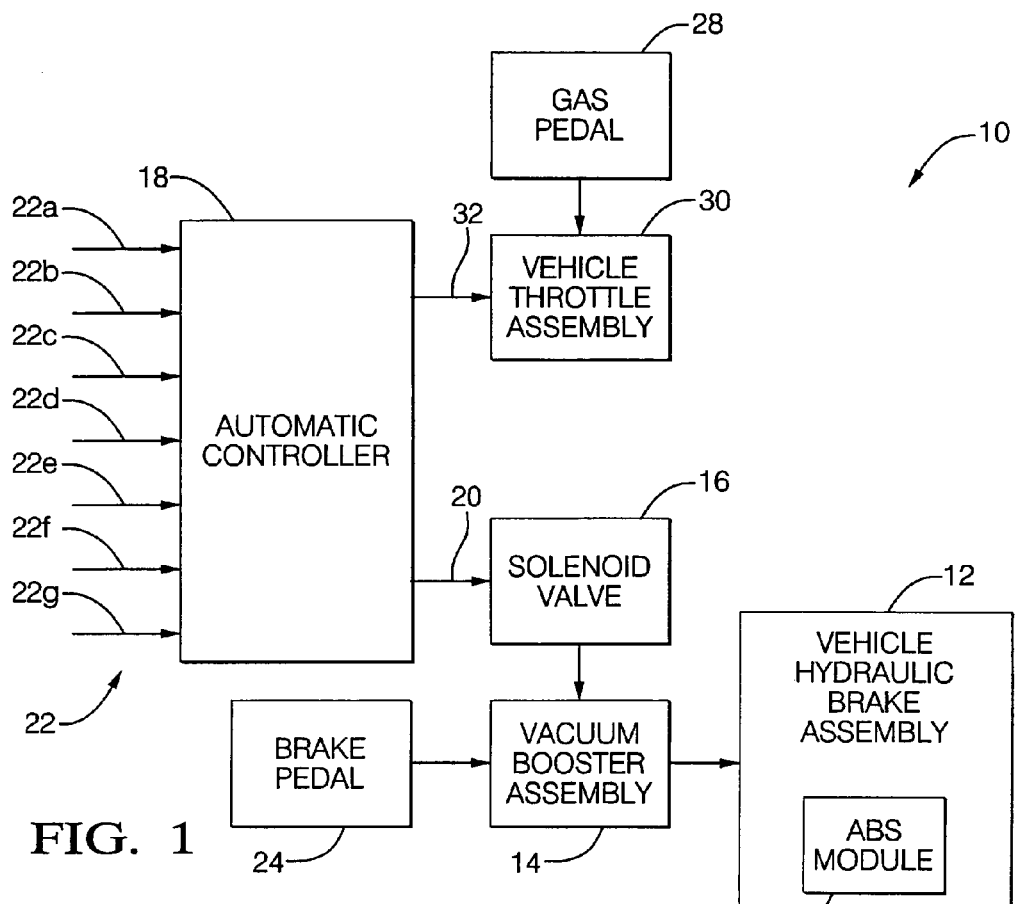
FIG. 1 is a schematic view of a first embodiment of the invention showing a vehicle autonomous brake-apply system which includes an automatic controller.

Referring now to the drawings, FIG. 1 illustrates a first embodiment of the present invention. A first expression of the embodiment of FIG. 1 is for a vehicle autonomous brake-apply system 10 including a vehicle hydraulic brake assembly 12, a vacuum booster assembly 14, a solenoid valve 16, and an automatic controller 18. The vacuum booster assembly 14 is operatively connected to the vehicle hydraulic brake assembly 12. The solenoid valve 16 is operatively connected to the vacuum booster assembly 14. The automatic controller 18 includes a first output signal 20 operatively connected to the solenoid valve 16 and includes at least one input signal 22. The first output signal 20 activates the solenoid valve 16 which activates the vacuum booster assembly 14 which activates the vehicle hydraulic brake assembly 12 depending on the at-least-one input signal 22. It is noted that the term "signal" includes a signal having a zero value as well as a signal having a non-zero value.

In one example of the first expression of the embodiment of FIG. 1, the at-least-one input signal 22 includes an object-detection signal 22a. In one variation, the object-detection signal 22a is an output signal from a sonar, a radar, or a laser object detection sensor. In one modification, the object-detection signal 22a, and any other at-least-one input signal 22, is an active high/low voltage, pulse, analog ramp, or CAN (controller area network) message. Other variations of object detection sensors and other modifications of controller input signals are left to the artisan.

In the same or a different example, the at-least-one input signal 22 includes a transmission-selection signal 22b. In the same or a different example, the at-least-one input signal 22 includes a vehicle-speed signal 22c. In one variation, wherein an object-detection signal 22a, a transmission-selection (e.g., park/reverse/neutral/drive) signal 22b, and a vehicle-speed signal 22c are available, the first output signal 20 of the automatic controller 18 activates the solenoid valve 16 when the object-detection signal 22a, the transmission-selection signal 22b, and the vehicle-speed signal 22c indicate the vehicle is heading toward the object at a speed which warrants a brake apply. In one modification, the automatic controller 18 modulates the first output signal 20 to smoothly reduce vehicle speed and to smoothly release brake apply when appropriate as can be appreciated by those skilled in the art. In one illustration, when the object-detection signal 22a indicates an object in front of the vehicle, and the transmission-selection signal 22b indicates the transmission is in reverse, the first output signal 20 of the automatic controller 18 would not activate the solenoid valve 16 (or no longer activate the solenoid valve 16 if the vehicle had come to a forward stop and the transmission was then placed in reverse). Other illustrations are left to the artisan.

In the same or a different example, the at-least-one input signal 22 includes a brake-pedal-position signal 22d. In one variation, wherein an object-detection signal 22a, a transmission-selection signal 22b, and a vehicle-speed signal 22c also are available and indicate a brake apply, the automatic controller 18 uses the brake-pedal-position signal 22d to determine if the first output signal 20 should activate the solenoid valve 16. If the brake-pedal-position signal 22d indicates the driver has sufficiently depressed the brake pedal 24, the first output signal 20 would not activate the solenoid valve 16. If the brake-pedal-position signal 22d indicates the driver has not sufficiently depressed the brake pedal 24, the first output signal 20 would activate the solenoid valve 16. Other variations and other input signals are left to the artisan.

In one enablement of the first expression of the embodiment of FIG. 1, the vehicle hydraulic brake assembly 12 includes an anti-lock-braking-system (ABS) module 26. In another enablement, it does not.

In one employment of the first expression of the embodiment of FIG. 1, the at-least-one input signal 22 includes a vehicle-speed signal 22c and includes a throttle-position signal 22e. In this employment, the throttle-position signal 22e is a gas pedal position signal, and, when the vehicle speed signal 22c indicates a zero vehicle speed and the gas pedal position signal indicates a non-depressed gas pedal 28, the first output signal 20 activates the solenoid valve 16. In one variation, the zero vehicle speed and the non-depressed gas pedal 28 occurs when the vehicle is stopped in traffic or is parked on level terrain or on a hill with the engine running or shut off, and the first output signal 20 is sufficient to hold the vehicle at rest on the level terrain or on the hill. Other variations and other throttle-position signals are left to the artisan.

A second expression of the embodiment of FIG. 1 is for a vehicle autonomous brake-apply system 10 including a vehicle throttle assembly 30, a vehicle hydraulic brake assembly 12, a vacuum booster assembly 14, a solenoid valve 16, and an automatic controller 18. The vacuum booster assembly 14 is operatively connected to the vehicle hydraulic brake assembly 12. The solenoid valve 16 is operatively connected to the vacuum booster assembly 14. The automatic controller 18 includes a first output signal 20 operatively connected to the solenoid valve 16, includes a second output signal 32 operatively connected to the vehicle throttle assembly 30, and includes at least one input signal 22. The first output signal 20 activates the solenoid valve 16 which activates the vacuum booster assembly 14 which activates the vehicle hydraulic brake assembly 12 depending on at least one of the at-least-one input signal 22. The second output signal 32 deactivates the vehicle throttle assembly 30 depending on at least one of the at-least-one input signal 22.

In one application of the second expression of the embodiment of FIG. 1, the at-least-one input signal 22 includes an object-detection signal 22a, a transmission-selection signal 22b, and a vehicle-speed signal 22c. In one variation, the at-least-one input signal 22 includes a brake-pedal-position signal 22d. In the same or a different variation, the at-least-one input signal 22 includes a throttle-position signal 22e. In one implementation, the second output signal 32 deactivates the vehicle throttle assembly 30 whenever the first output signal 20 activates the solenoid valve 16. In one modification, the second output signal 32 does not deactivate the vehicle throttle assembly 30 if the throttle-position signal 22e indicates a non-depressed gas pedal 28.

In one implementation of the second expression of the embodiment of FIG. 1, the at-least-one input signal 22 includes a steering-angle signal 22f, a lateral-acceleration signal 22g, and a vehicle-speed signal 22c. In one employment, the first output signal 20 of the automatic controller 18 activates the solenoid valve 16 when the steering-angle signal 22f, the lateral-acceleration signal 22g, and a vehicle-speed signal 22c indicate the vehicle is making a turn at a speed which warrants a brake apply. In one modification, the automatic controller 18 modulates the first output signal 20 to smoothly reduce vehicle speed and to smoothly release brake apply when appropriate as can be appreciated by those skilled in the art.

In one variation, the at-least-one input signal 22 includes a brake-pedal-position signal 22d. In one modification, wherein a steering-angle signal 22f, a lateral-acceleration signal 22g, and a vehicle-speed signal 22c are available and indicate a brake apply, the automatic controller 18 uses the brake-pedal-position signal 22d to determine if the first output signal 20 should activate the solenoid valve 16. If the brake-pedal-position signal 22d indicates the driver has sufficiently depressed the brake pedal 24, the first output signal 20 would not activate the solenoid valve 16. If the brake-pedal-position signal 22d indicates the driver has not sufficiently depressed the brake pedal 24, the first output signal 20 would activate the solenoid valve 16.

In the same or a different variation, the at-least-one input signal 22 includes a throttle-position signal 22e. In one modification, wherein a steering-angle signal 22f, a lateral-acceleration signal 22g, and a vehicle-speed signal 22c are available and indicate a brake apply, the automatic controller 18 deactivates the vehicle throttle assembly 30 whenever the first output signal 20 activates the solenoid valve 16. In one alteration, the second output signal 32 does not deactivate the vehicle throttle assembly 30 if the throttle-position signal 22e indicates a non-depressed gas pedal 28.

In one extension, the vehicle hydraulic brake assembly 12 includes a right front brake subassembly and a left front brake subassembly, and the automatic controller 18 is operatively connected to the right and left front brake subassemblies and enables only one of the right and left front brake subassemblies 34 and 36 when the vehicle is making a turn at a speed which warrants a brake apply and the first output signal 20 activates the solenoid valve 16. In one deployment during such turn, only the right front brake subassembly is enabled for a right steering angle and only the left front brake subassembly is enabled for a left steering angle. Other extensions are left to the artisan.

In one enablement of the second expression of the embodiment of FIG. 1, the vehicle hydraulic brake assembly 12 includes an anti-lock-braking-system (ABS) module 26. In another enablement, it does not.

In one configuration of the second expression of the embodiment of FIG. 1, the at-least-one input signal 22 includes a vehicle-speed signal 22c and includes a throttle-position signal 22e. In one variation, the throttle-position signal 22e is a gas pedal position signal, and, when the vehicle speed signal 22c indicates a zero vehicle speed and the gas pedal position signal indicates a non-depressed gas pedal 28, the first output signal 20 activates the solenoid valve 16 and the second output signal 32 deactivates the vehicle throttle assembly 30.

Figure 2:
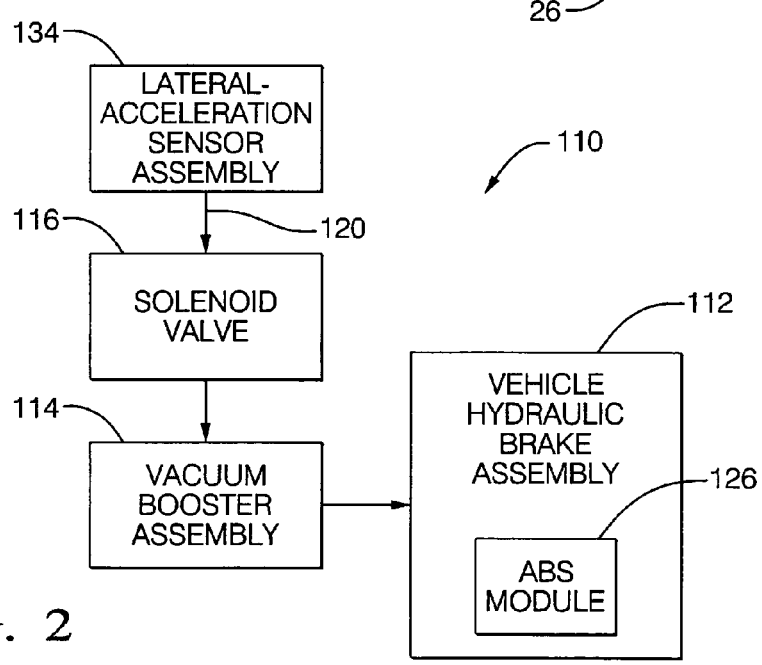
FIG. 2 is a schematic view of a second embodiment of the invention showing a vehicle autonomous brake-apply system which does not include an automatic controller.

Referring again to the drawings, FIG. 2 illustrates a second embodiment of the present invention. A first expression of the embodiment of FIG. 2 is for a vehicle autonomous brake-apply system 110 including a vehicle hydraulic brake assembly 112, a vacuum booster assembly 114, a solenoid valve 116, and a lateral-acceleration sensor assembly 134. The vacuum booster assembly 114 is operatively connected to the vehicle hydraulic brake assembly 112. The solenoid valve 116 is operatively connected to the vacuum booster assembly 114. The lateral-acceleration sensor assembly 134 includes an output signal 120 operatively connected to the solenoid valve 116, wherein the output signal 120 has a predetermined action level. The output signal 120 activates the solenoid valve 116 which activates the vacuum booster assembly 114 which activates the vehicle hydraulic brake assembly 112 when the output signal 120 equals or exceeds the predetermined action level.

In one enablement of the first expression of the embodiment of FIG. 2, the vehicle hydraulic brake assembly 112 includes an anti-lock-braking-system (ABS) module 126. In another enablement, it does not.

Figure 3:
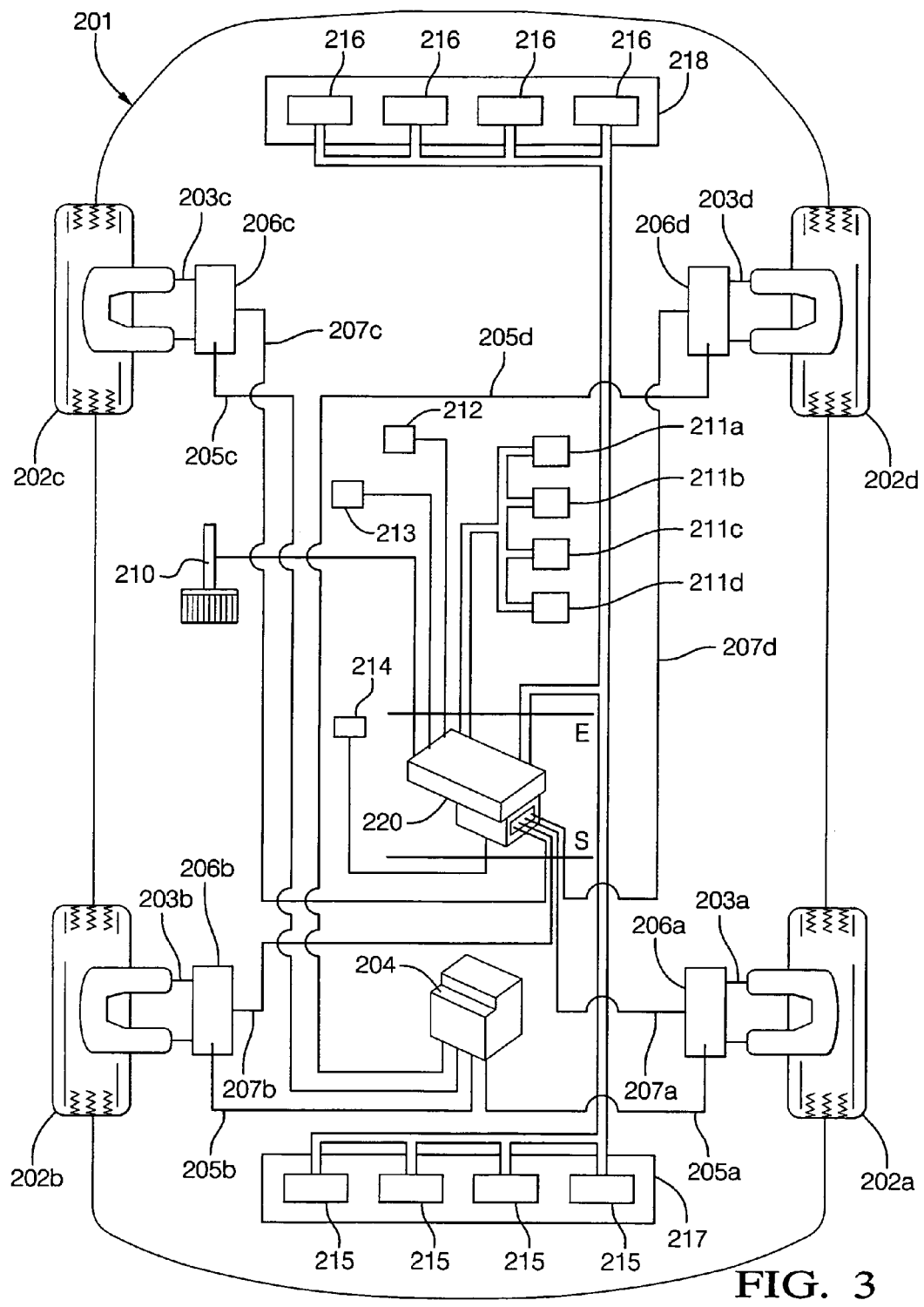
FIG. 3 is a diagrammatic representation of a vehicle including a system for assisting driving of the vehicle in accordance with a third embodiment of the invention.

Referring to FIG. 3, a method of the invention is for assisting driving of a vehicle 201 and includes several steps. One step includes measuring a distance between the vehicle 201 and an obstacle using at least one distance sensor 215 and 216. Another step includes applying a braking force to at least one wheel 202a-d of the vehicle 201 using a braking device, wherein the braking force is adapted as a function of the measured distance to stop the vehicle 201 before the vehicle strikes the obstacle, and wherein the braking force is applied by an electrical braking device 203a-d and 206a-d provided with an integrated parking brake permitting locking of the electrical braking device 203a-d and 206a-d in a clamping position. Another step includes applying a clamping force to the at-least-one wheel 202a-d of the vehicle 201 using the parking brake when the vehicle 201 has been stopped for a predetermined period.

In one application, the method permits parking of the vehicle 201 easily without striking an obstacle. In one variation, the vehicle 201 is automatically stopped and the parking brake is automatically applied without the intervention of the driver. In one modification, the method is easily implemented by a single braking device controlled by a controller 220.

In one extension of the method, there are also included the steps of determining the gradient of a surface on which the vehicle 201 is located using a gradient sensor 212 and adjusting the clamping force applied by the parking brake as a function of the gradient. In one implementation, in this manner, it is ensured that the vehicle 201 is held in position even on a surface with a steep gradient.

In the same or a different extension of the method, there are also included the steps of determining a rate of temporal variation of the braking force as a function of the measured distance and modifying the braking force applied by the braking device according to the rate of temporal variation. In one implementation, the braking force applied is rapidly adapted to a new situation. For example, if the obstacle is not stationary but is approaching or moving away from the vehicle, the rate of temporal variation of braking force is modified so that the braking force is rapidly adapted to the new position of the obstacle.

In one variation, there are also included the steps of determining a direction of displacement of the vehicle 201 and calculating the rate of temporal variation as a function of the direction of displacement of the vehicle 201. In one implementation, this allows compensation of the braking which can be less effective when moving forwards than when moving in reverse. In fact, in the case of forward braking, there is a transfer of load onto the front train, thus lightening the rear train. This involves less efficient braking, particularly where braking is only applied to the rear train.

In the same or a different variation, there are also included the steps of determining the gradient of a surface on which the vehicle 201 is located by means of a gradient sensor 212 and calculating the rate of temporal variation as a function of the gradient. In one implementation, taking into account the gradient in determining the rate of temporal variation also allows the braking force to be rapidly adapted to a new situation. For example, if the vehicle 201 is traveling on a path in the course of which the gradient changes, the braking force will be rapidly adapted to the new gradient.

In the same or a different variation, there are also included the steps of: determining a distance remaining to be traveled by subtracting a predetermined target stopping distance from the distance measured by the distance sensor; determining an overall velocity of the vehicle; determining a predictable stopping distance as a function of the overall velocity and of a predetermined target deceleration; determining a term of retroactive effect as a function of the difference between the predictable stopping distance and the distance remaining to be traveled; and determining the rate of temporal variation of the braking force as a function of the term of retroactive effect. In one implementation, with a retroactive effect of this type, the vehicle 201 is braked so that it stops at a predetermined distance from the obstacle with high accuracy. It is noted that the fact of taking into account the velocity of the vehicle 201 to determine the rate of temporal variation also allows the braking force to be rapidly adapted to a new situation. For example, if the vehicle is struck by a second vehicle and its velocity suddenly increases, the braking force will be rapidly adapted to the new velocity.

In one modification, the term of retroactive effect is calculated by forming the sum of a term proportional to the difference between the predictable stopping distance and the distance remaining to be traveled, of a term proportional to the temporal derivative of the difference, and of a term proportional to a temporal integral of the difference. In this modification, there are also included the steps of: forming the product of the sum and a gain, the gain being a function of the direction of displacement of the vehicle 201; adding a distance term to the product when the distance remaining to be traveled is less than a proximity threshold or when the difference between the predictable stopping distance and the distance remaining to be traveled is greater than a threshold difference; and adding a gradient term to the product, the gradient term being a function of the gradient of a surface on which the vehicle 201 is located using a gradient sensor 212. In this modification, the rate of temporal variation is equal to the term of retroactive effect thus obtained.

Referring again to FIG. 3, a third embodiment of the invention is for a system, for assisting driving of a vehicle 201, including a braking controller 220, a braking device, and at least one distance sensor 215 and 216. The braking device is able to apply a braking force to at least one wheel 202a-d of the vehicle 201 under the control of the braking controller 220. The at-least-one distance sensor 215 and 216 is able to measure the distance between the vehicle 201 and an obstacle. The braking controller 220 is able to adapt the braking force as a function of the distance measured by the at-least-one distance sensor 215 and 216 so as to stop the vehicle 201 before the vehicle 201 strikes the obstacle. The braking device is an electrical braking device 203a-d and 206a-d provided with an integrated parking brake. The braking controller 220 is able to engage the parking brake when the vehicle 201 has been stopped for a predetermined period.

In one application, the embodiment of FIG. 3 permits parking of the vehicle 201 easily without striking an obstacle.

In one employment of the embodiment of FIG. 3, the system also includes a gradient sensor 212 able to measure the gradient of a surface on which the vehicle 201 is located, the controller 220 being able to regulate a clamping force of the parking brake as a function of the gradient.

In the same or a different employment, the braking controller 220 is able to modify the braking force in accordance with a rate of temporal variation of the braking force which is determined by the braking controller as a function of the distance measured by the distance sensor 215 and 216.

In one example, the system also includes a velocity sensor 211a-d able to measure an overall velocity of the vehicle 201, the braking controller 220 being able to determine the rate of variation as a function of the overall velocity. In the same or a different example, the braking controller 220 is able to determine the rate of variation as a function of the gradient.

In the same or a different employment, the at-least-one distance sensor 215 and 216 includes at least one distance sensor 216 positioned at the rear of the vehicle 201 so as to measure the distance between the vehicle 201 and an obstacle situated in the path of the vehicle 201 when the vehicle 201 is reversing.

In the same or a different employment, the at-least-one distance sensor 215 and 216 includes at least one distance sensor 215 positioned at the front of the vehicle 201 so as to measure the distance between the vehicle 201 and an obstacle situated in the path of the vehicle 201 when the vehicle 201 is moving forwards.

In the same or a different employment, the system also includes an angle sensor able to measure the angle formed by the steered wheels 202a-b of the vehicle 201 relative to the longitudinal axis of the vehicle 201, the braking controller 220 being able to determine the distance between the vehicle 201 and the obstacle as a function of the distances measured by the at-least-one distance sensor 215 and 216 and of the angle measured by the angle sensor.

Figure 4:
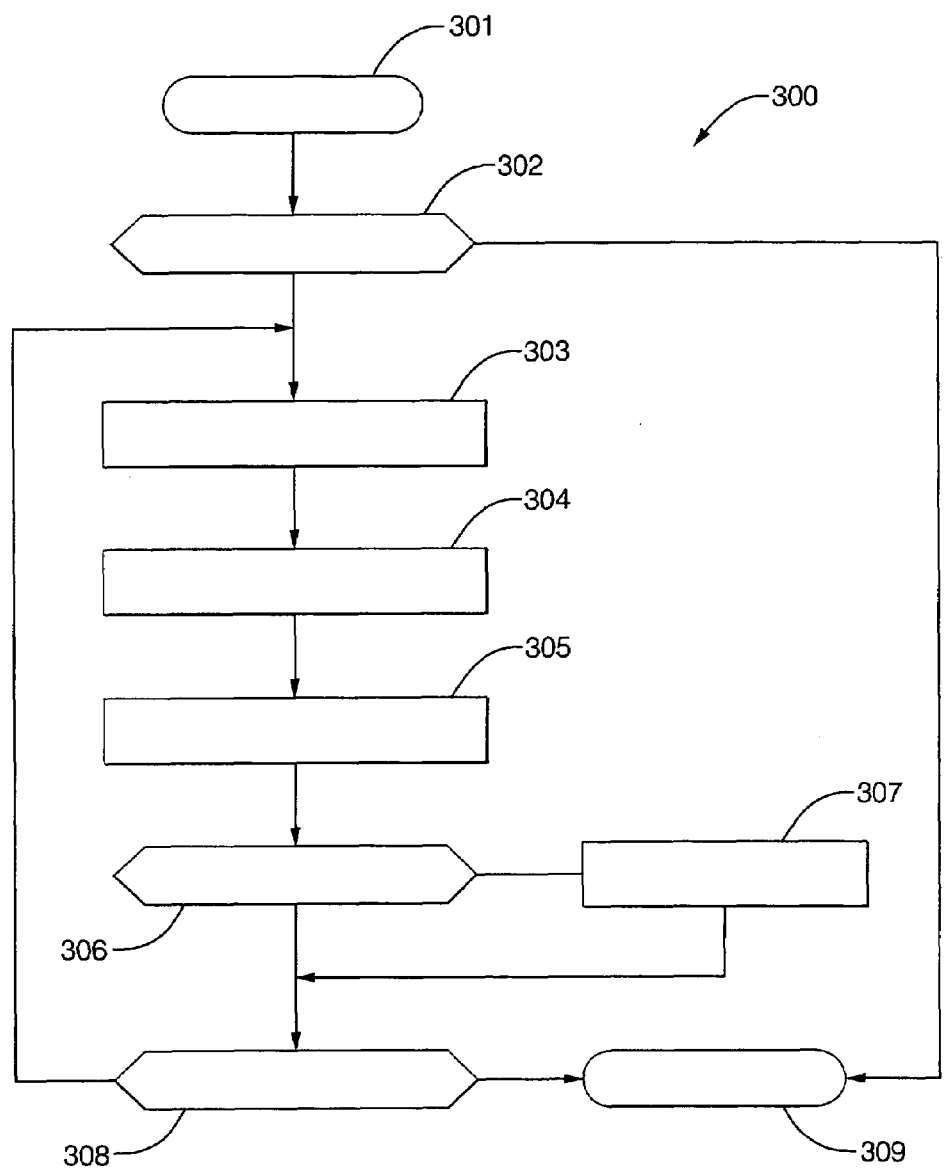
FIG. 4 is a block diagram of one example of a method of the invention for assisting driving of a vehicle.

The following paragraphs refer to FIGS. 3 and 4 and describe a particular example of the method, and a particular example of the third embodiment, of the invention, wherein other examples are left to the artisan, and wherein the hereinafter described particular examples are not intended to limit the previous description of the method and the third embodiment of the invention and are not intended to limit the previously described extensions, applications, variations, modifications, employments, etc. of such method and third embodiment.

In FIG. 3, a motor vehicle 201 is shown diagrammatically from above including a system for assisting driving of the vehicle 201 in accordance with a third embodiment of the invention. The vehicle 201 has two front wheels 202a and 202b and two rear wheels 202c and 202d. Generally, the description of a plurality of identical mechanisms will be given by describing only one of these mechanisms, in the singular.

Each of the wheels 202a-d is provided with an electromechanical caliper 203a-d. The electromechanical caliper 203a-d is able to apply a clamping force to a disc rigidly attached to the wheel 202a-d. More particularly, the clamping force is obtained by mutual approach movement of two brake pads arranged on either side of the disc. The clamping force at right angles to the disc generates a braking torque able to reduce the angular rotational velocity of the disc and therefore of the wheel 202a-d. The electromechanical caliper 203a-d includes an electric motor and a coupling system to transform the rotational motion of the output shaft of the electric motor into a movement of translation of one pad towards or away from the other. The electric motor of the electromechanical caliper 203a-d is supplied with electrical power through an inverter 206a-d. The latter adjusts the parameters of the electric current supplied by a battery 204 via a supply line 205a-d to supply the electric motor.

The electromechanical caliper 203a-d is also provided with an integrated parking brake function. To this end, the caliper 203a-d includes a mechanical lock which can be switched into a stable locking position to lock the coupling system in a position in which the plates apply a high clamping force to the disc of the wheel 202a-d. Thus, even if the power supply to the motor is cut, the clamping force is maintained, preventing the vehicle from being displaced. Such an electromechanical caliper is known, for example, from U.S. Pat. No. 6,315,092 or WO 03/050437.

The vehicle includes an on-board controller 220. The controller 220 has at least one memory and a processor intended to execute various programs stored in the memory. The controller 220 also has a series of inputs, generally indicated by the letter E, and a series of outputs S. The controller 220 is, consequently, provided for each of the inputs E with data acquisition means able to read the signal at the corresponding input and write the value relating to the signal read to a predetermined memory space. Similarly, for each output S, the controller 220 includes emission means able to read data from a predetermined memory space and emit a signal at the corresponding output, relating to the data read.

The vehicle 201 includes a series of sensors connected to the input of the controller 220.

The vehicle 201 includes a braking demand sensor 210 able to emit a signal as a function of the depression of a brake peddle on which the driver of the vehicle presses when he wishes to brake. Preferably, the signal emitted is proportional to, or more generally positively correlated with, the degree of depression of the brake pedal.

The vehicle 201 also includes four wheel velocity sensors 211a-d. The wheel velocity sensor 211a-d measures the angular rotational velocity of the wheel 202a-d. For example, the wheel velocity sensor 211a-d includes a fixed part mounted on the body of the vehicle 201 and a moveable part fixed to the wheel 202a-d. The number of passages per unit time of the moveable part relative to the fixed part gives a measurement of the angular velocity of the wheel. It is easy to know the linear velocity of the point of contact of the wheel with the ground by multiplying the angular velocity by the radius of the wheel 202a-d. The controller 220 executes a program in real time allowing the processor to calculate the overall velocity of the vehicle 201 from instantaneous angular velocities measured at the different wheels by the sensors 211a-d.

Moreover, the electromechanical caliper 203a-d includes, as a clamping force sensor (for example such as mentioned by U.S. Pat. No. 6,315,092, column 3, lines 42-46), a piezoelectric sensor (not shown) able to measure the clamping force actually applied by the electromechanical caliper 203a-d to the brake disc. The different clamping force sensors are connected to an input of the controller 220. Other means for estimation of the clamping force could be considered without thereby departing from the scope of the present invention. For example, it is possible to estimate the clamping force from measurements of angle and intensity, as described by FR-2855610. Knowing the clamping force, the controller 220 can easily calculate the corresponding braking torque.

The vehicle 201 is provided with a gradient sensor 212 able to measure the gradient of the surface on which the vehicle is located.

An activation button 213 is situated on the dashboard of the vehicle 220. The button 213 can be operated by the driver of the vehicle to indicate to the controller 220 whether the driving assistance function can be activated.

The vehicle also includes other sensors (not shown in FIG. 1): a direction sensor to determine whether the vehicle is being displaced forwards or backwards; a gearbox sensor to determine which gear is engaged and, in the case of a manual gearbox, the declutched or clutched state; and an angle sensor able to measure the angle formed by the steered wheels of the vehicle relative to the vehicle's longitudinal axis.

The vehicle 201 includes four front distance sensors 215 and four rear distance sensors 216 positioned in the front bumper 217 and the rear bumper 218 respectively. The distance sensors are uniformly distributed along the bumper. These distance sensors can, for example, be infra-red sensors or radar sensors. They allow the controller 220 to measure a distance D0 between the vehicle and an obstacle in its path. To determine this distance D0, the controller 220 uses the four distances measured by the sensors 215 or 216 corresponding to the direction of displacement of the vehicle, indicated by the direction sensor. The distance D0 between the vehicle and the obstacle is, for example, programmed to be the mean of the four distances measured by the sensors 215 or 216. This mean can optionally be a mean weighted as a function of the angle measured by the angle sensor, in order to take into account the lateral displacement of the vehicle. Alternatively, the distance D0 can be selected equal to the minimum distance of the distances measured by the distance sensors 215 or 216.

The controller 220 has, inter alia, the function of executing programs in real time permitting calculation of the value of the clamping force which each of the electromechanical calipers 203a-d must apply. Thus, the braking force is not simply proportional to the depression measured by the sensor 210, but is so calculated as to improve the comfort, safety, drivability of the vehicle, etc. One of the programs performs the driving assistance function in accordance with a method of the invention. Other programs can be provided to perform other functions. For example, the controller 220 can execute a program to prevent locking of the wheels (ABS). The value of the clamping force calculated at each moment by the controller 220 is called the target clamping force. The controller 220 emits, at its corresponding output, a control signal, relating to the target clamping force, to the inverter 206a-d through an associated electrical connection 207a-d. In response to this control signal, the inverter 206a-d operates the electric motor of the electromechanical caliper 203a-d for the clamping force, which the electromechanical caliper 203a-d applies, to correspond to the target clamping force. Certain of the programs executed by the controller 220 can give, as a result, a braking torque to be applied. In this case, the controller 220 determines the corresponding target clamping force.

An output of the controller 220 corresponds to an indicator 214 of operation of the driving assistance function. This indicator 214 comprises a green light and a red light situated on the dashboard. Their role will be explained below.

Lastly, an output of the controller 220 is intended to engage the parking brake by electrically controlling the lock of the caliper 23a-d. For example, an output of the controller 220 is able to magnetize or de-magnetize an electromagnet. A spring pushes the lock into the locking position while the electromagnet is able (when it is magnetised) to displace the lock from its locking position as explained, for example, in column 4 lines 34-43 in U.S. Pat. No. 6,315,092.

If the button 213 is depressed, the processor of the controller 220 periodically executes a stopping braking program 300 stored in its memory in order to provide the driving assistance function. FIG. 4 shows, in the form of a flow-chart, a stopping braking program 300 in accordance with a method of the invention. If the button 213 is not depressed, the controller does not execute the program 300.

Execution of the program starts at the entry point 301 and then passes to step 302 in which the controller 220 tests whether entry conditions are verified.

Depending on the direction of displacement of the vehicle, the controller 220 tests whether the distances read by the distance sensors 215 or 216 are less than the maximum operating distance $D_{max}$ of the distance sensors. If this is the case, this entry condition is verified. The maximum distance $D_{max}$ is specified by the manufacturer of the sensors and is stored in the memory of the controller 220. If the distance read by the sensors 215 or 216 is greater than $D_{max}$, this signifies firstly that the distances read are not accurate and secondly that the vehicle 220 is not close to an obstacle. In this case, this entry condition is not verified.

The controller 220 tests whether the distance D0 between the vehicle and the obstacle is less than a collision risk threshold $D_r$. The distance $D_r$ is also stored in the memory. Preferably, two values $D_{r\_av}$ and $D_{r\_ar}$ are stored, corresponding to forward and reverse displacement respectively. If the distance D0 is less than the threshold $D_r$ corresponding to the direction of displacement of the vehicle, the condition is verified.

The controller 220 tests whether the velocity of the vehicle is less than a predetermined threshold $V_{max}$ and greater than zero. If this is the case, this entry condition is verified.

In the case of a manual gearbox, the controller 220 tests whether the box is in the declutched state or whether the gear selected is neutral. In the case of an automatic gearbox, the controller 220 tests whether the gear selected is neutral. If this is the case, this entry condition is verified.

Lastly, the controller 220 tests whether the parking brake is engaged. If this is the case, this entry condition is not verified.

If at least one of these conditions is not verified, the program passes to 309. If all the entry conditions are verified, the program enters an iterative calculation loop 303-308 by passing to step 303.

At 303, the controller 220 performs different calculations in order to determine a rate of temporal variation of the braking torque Tx.

The controller 220 calculates a distance remaining to be travelled D1 equal to the difference between the distance D0 measured between the vehicle and the obstacle and a predetermined target stopping distance R0. Thus if, for example, the distance R0 is 20 cm, the controller will brake the vehicle for the vehicle to stop at 20 cm from the obstacle.

Then, the controller calculates a predictable stopping distance D2 as a function of the overall velocity v of the vehicle 1 and of a predetermined target deceleration d in the following manner: $D2=v^2/(2*d)$. The deceleration d is, for example, 6 m/s$^2$.

The difference $D3=D2-D1$ permits determination of whether the vehicle will effectively stop at the predetermined target stopping distance R0.

A term of retroactive effect TC is calculated by forming the sum of a term proportional to the distance D3, of a term proportional to the temporal derivative of the distance D3, and a term proportional to a temporal integral of the distance D3 (PID control).

If braking is performed only on the rear wheels, the term TC is multiplied by a gain G1 to obtain a retroactive effect term TC1=TC*G1. The gain has a different value depending on the direction of displacement of the vehicle. In fact, in case of forward braking, a load transfer takes place onto the front train thus lightening the rear train. This involves less efficient braking where braking is only performed on the rear train. The gain G1 therefore has a larger value when the vehicle is displaced forwards, to compensate for the less efficient braking.

A retroactive effect term TC2 is equal to the sum of the term TC1 and a constant K2: TC2=TC1+K2. The constant K2 ensures that the rate of temporal variation Tx is not zero. In another application, K2 is not added.

If the distance D1 is less than a predetermined proximity threshold R1, for example 40 cm, or if the distance D3 is greater than a predetermined difference threshold R2, for example 2 cm, a retroactive effect term TC3 is calculated by forming the sum of the term TC2 and a distance term K3. Otherwise, TC3 is equal to TC2. This allows braking to be increased when near to the obstacle or when the high value of D3 allows prediction that stopping will not occur at the predetermined target stopping distance R0 from the obstacle. By adding the term K3, braking is so modified as to improve the probability of effectively stopping at the predetermined target stopping distance.

Lastly, the gradient of the surface on which the vehicle is located is taken into account. A retroactive effect term TC4 is calculated by forming the sum of the term TC3 and of a gradient term K4. The term K4 is positive if the vehicle is descending, to increase braking. The term K4 is negative if the vehicle is climbing, to reduce braking. The term K4 is zero if the vehicle is on a horizontal surface.

The rate of temporal variation Tx is equal to the term TC4.

Execution of the program then passes to step 304, in which the braking torque to be applied CC(n) is calculated by forming the sum of the braking torque of the preceding iteration CC(n−1) and of the product of the variation rate Tx determined in step 303 and the execution time π of the iterative calculation loop 303-308. On the first passage in the loop, the braking torque at the preceding iteration is an initial torque CC(0) which is taken to be equal to the braking torque corresponding to the clamping force measured by the piezoelectric sensor of the caliper 203a-d. Thus, there is no discontinuity in the torque to be applied.

If the preceding calculation gives, as its result, a torque greater than the maximum torque $CC_{max}$, the torque to be applied is the torque $CC_{max}$. The torque $CC_{max}$ is so selected as to prevent locking of the wheels which would be detrimental to braking efficiency and comfort.

At 305, an operating signal is emitted by means of the indicator 214. The green light is lit on the dashboard to indicate to the driver that the driving assistance function is active and that the braking force applied is that calculated by the controller 220 in execution of the program 300. The red light is lit if the distance D3 is greater than zero, to indicate that there is a risk of collision with the obstacle. In this case, the driver can make the decision to press on the brake pedal. The indicator 214 can optionally include a loudspeaker. In this case, the controller 220 causes the loudspeaker to emit a sound with a frequency as high as the distance D0 is small.

At 206, a test is performed as to whether the velocity of the vehicle is zero. If this is the case, the program passes to 307, otherwise it passes to 308.

At 207, a static mode is entered. The controller tells the electromechanical caliper 203a-d to continue to apply the braking torque determined at 304, and the controller determines a braking torque for parking of the vehicle. This braking torque for parking is as high as the gradient, on which the vehicle 201 is located (as measured by the gradient sensor 212), is steep. After a predetermined period, for example 2 s (seconds), the controller 220 tells the caliper 203a-d to apply the braking torque for parking of the vehicle by means of the electric motor, and the controller 220 engages the parking brake by electrically controlling the lock of the caliper 203a-d. Thus, the vehicle has been stopped at a distance from the obstacle and the parking brake has been engaged, with sufficient clamping, without intervention of the driver. Execution of the program passes to 308 and then to 309 since engagement of the parking brake is an exit condition.

At 208, the controller 220 tests whether exit conditions are verified.

The controller 220 tests whether the driver has deactivated the driving assistance function by means of the button 213. In this case, this exit condition is verified and the clamping force to be applied is no longer to be determined by the program 300.

The controller 220 tests whether the parking brake has been engaged. This is the case if execution of the program 300 has passed through step 307. This exit condition is then verified.

The controller 220 also tests whether the distance D0 is greater than the threshold R0. In fact, the obstacle can be displaced so that there is no longer a risk of collision with it. If this is the case, this exit condition is verified.

If none of the exit conditions is verified, the program returns to 303. Otherwise, execution of the program passes to 309.

Execution of the program is terminated at the exit point 309. Periodically, and while the activation button 213 is depressed, the controller will execute the program 300 again starting at the entry point 301.

As a modification to the method and the third embodiment which have just been described, other characteristics can be envisaged.

A vehicle has been described which is fitted with an entirely electrical braking device. Alternatively, a hybrid braking system may be employed, comprising, for example, hydraulic calipers to brake the front wheels and electromechanical calipers to brake the rear wheels. The method in accordance with the invention is then applied to the braking of the rear wheels. The target deceleration is then suited to the number of wheels braked. For example, if braking is applied to the two rear wheels, the target deceleration is two or three or four m/s$^2$.

In the third embodiment described, there are four front distance sensors and four rear distance sensors. Alternatively, there may be more or fewer distance sensors. There may not be front distance sensors or there may not be rear distance sensors. The controller can be adapted to detect the sensors present. In this case, if, for example, the controller detects that there are no front sensors, the driving assistance function will only be activated if the vehicle is displaced in reverse.

A program has been described in which a braking torque is calculated. In equivalent manner, the program could calculate a clamping force.

The activation button described can be replaced by any element allowing the driver to indicate whether he or she wishes the assistance function to be active or otherwise.

The braking controller can consist of an equipment unit (centralised architecture) or of a plurality of equipment units (distributed architecture). The assistance function is preferably obtained by programming the braking controller. However, this function can also be implemented by means of an electronic circuit specifically designed for this purpose.

The method described can be implemented with other entry and exit conditions than those which have been described. For example, the entry condition relating to the gear selected or the declutched state of the gearbox can be removed.

Several benefits and advantages are derived from one or more of the embodiments and method of the invention. In one example, with an appropriate at-least-one input signal, the vehicle autonomous brake-apply system helps keep a distance between the vehicle and an object in the path of the vehicle. In the same or a different example, with an appropriate at-least-one input signal, the system helps keep all vehicle tires on the road. In the same or a different example, with an appropriate at-least-one input signal, the system helps keep a stopped vehicle at rest.

The foregoing description of several expressions of embodiments and a method of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

The invention claimed is:

1. A method for assisting driving of a vehicle having a plurality of wheels comprising the steps of:
    measuring a distance between the vehicle and an obstacle using at least one distance sensor;
    determining a distance remaining to be traveled by subtracting a predetermined target stopping distance from the distance measured by the distance sensor;
    determining an overall velocity of the vehicle;
    determining a predictable stopping distance as a function of the overall velocity and of a predetermined target deceleration;
    determining a term of retroactive effect as a function of the velocity and of the difference between the predictable stopping distance and the distance remaining to be traveled;
    wherein the term of retroactive effect is calculated by forming the sum of a term proportional to the difference between the predictable stopping distance and the distance remaining to be traveled, of a term proportional to the temporal derivative of the difference, and of a term proportional to a temporal integral of the difference;
    forming the product of the sum and a gain, the gain being a function of the direction of displacement of the vehicle;
    adding a distance term to the product when the distance remaining to be traveled is less than a proximity threshold or when the difference between the predictable stopping distance and the distance remaining to be traveled is greater than a threshold difference;
    adding a gradient term to the product, the gradient term being a function of the gradient of a surface on which the vehicle is located measured using a gradient sensor;
    determining a rate of temporal variation as a function of the term of retroactive effect;
    applying a braking force to at least one wheel of the vehicle using a braking device; and
    modifying the braking force applied by the braking device according to the rate of temporal variation.

2. The method of claim 1, also including the steps of:
    determining the gradient of a surface on which the vehicle is located using a gradient sensor; and
    adjusting the clamping force applied by the parking brake as a function of the gradient.

3. The method of claim 1, also including the steps of:
    determining a direction of displacement of the vehicle; and
    calculating the rate of temporal variation as a function of the direction of displacement of the vehicle.

4. The method of claim 1, also including the steps of:
    determining the gradient of a surface on which the vehicle is located by means of a gradient sensor; and
    calculating the rate of temporal variation as a function of the gradient.

5. The method of claim 1 wherein the braking device is an electrical braking device including an integrated parking brake permitting locking of the electrical braking device in a clamping position.

6. The method of claim 5, also including the step of applying a clamping force to the at least one wheel of the vehicle using the parking brake when the vehicle has been stopped for a predetermined period.

7. A system for assisting driving of a vehicle having a plurality of wheels comprising:
    at least one distance sensor for measuring a distance between the vehicle and an obstacle;

a velocity sensor for measuring the velocity of the vehicle;
a braking device for applying a braking force to at least one of the wheels of the vehicle;
a braking controller in electrical communication with said braking device, wherein said controller performs the steps of determining a predictable stopping distance as a function of the velocity of the vehicle and of a predetermined target acceleration; for determining a rate of temporal variation as a function of the difference between said predictable stopping distance and the distance between the vehicle and the obstacle, wherein said function comprises the sum of a term proportional to said difference, a term proportional to the temporal derivative of said difference, and a term proportional to the temporal integral of said difference; and modifying said braking force applied by said braking device according to said rate of temporal variation.

8. The system of claim 7 also including a gradient sensor in electrical communication with said braking controller for measuring the gradient of a surface on which the vehicle is located and for allowing said braking controller to determine said rate of temporal variation as a function of the gradient.

9. The system of claim 7, wherein said at least one distance sensor includes at least one distance sensor positioned at the rear of the vehicle for measuring the distance between the vehicle and an obstacle situated in the path of the vehicle when the vehicle is reversing.

10. The system of claim 7, wherein said at least one distance sensor includes at least one distance sensor positioned at the front of the vehicle for measuring the distance between the vehicle and an obstacle situated in the path of the vehicle when the vehicle is moving forwards.

11. The system of claim 7, also including an angle sensor able for measuring the angle formed by the steered wheels of the vehicle relative to a longitudinal axis extending along the vehicle, said braking controller being able to determine the distance between the vehicle and the obstacle as a function of the distances measured by said at least one distance sensor and of said angle measured by said angle sensor.

12. The system of claim 7 wherein said braking device is an electrical braking device provided with an integrated parking brake and said braking controller is able to engage said parking brake when the vehicle has been stopped for a predetermined time.

13. The system of claim 7 further including a gradient sensor in electrical communication with said braking controller for measuring the gradient of a surface on which the vehicle is located, said braking controller being able to regulate a clamping force of a parking brake as a function of the gradient.

* * * * *